United States Patent
Halén et al.

(10) Patent No.: US 11,367,262 B2
(45) Date of Patent: Jun. 21, 2022

(54) MULTI-DIMENSIONAL ACCELERATION STRUCTURE

(71) Applicant: Electronic Arts Inc., Redwood City, CA (US)

(72) Inventors: Karl Henrik Halén, Northridge, CA (US); David Andreas Brinck, Redondo Beach, CA (US)

(73) Assignee: Electronic Arts Inc., Redwood City, CA (US)

( * ) Notice: Subject to any disclaimer, the term of this patent is extended or adjusted under 35 U.S.C. 154(b) by 268 days.

(21) Appl. No.: 16/865,849

(22) Filed: May 4, 2020

(65) Prior Publication Data
US 2021/0343089 A1 Nov. 4, 2021

(51) Int. Cl.
*G06T 19/20* (2011.01)

(52) U.S. Cl.
CPC .......... *G06T 19/20* (2013.01); *G06T 2200/04* (2013.01); *G06T 2219/2016* (2013.01)

(58) Field of Classification Search
None
See application file for complete search history.

(56) References Cited

U.S. PATENT DOCUMENTS

2011/0234583 A1* 9/2011 Bakalash ................ G06T 15/06
345/419

OTHER PUBLICATIONS

Greene, Ned. "Environment Mapping and Other Applications of World Projections," IEEE Comput. Graph. Appl., vol. 6, No. 11, pp. 21-29 (Nov. 1986).
Bentley et al., "Multidimensional Binary Search Trees Used for Associative Searching," Communications of the ACM, vol. 18, No. 9, pp. 509-517 (Sep. 1975).
Meagher, Donald J.R. "Octree Encoding: A New Technique for the Representation, Manipulation and Display of Arbitrary 3-D Objects by Computer," Rensselaer Polytechnic Institute, Electrical and Systems Engineering Department, Technical Report IPL-TR-80-111 (Oct. 1980).
Wikipedia. "Cube Mapping," available at https://web.archive.org/web/20190405173021/https://en.wikipedia.org/wiki/Cube_mapping (Apr. 3, 2019).

* cited by examiner

*Primary Examiner* — Kent W Chang
*Assistant Examiner* — Jonathan M Cofino
(74) *Attorney, Agent, or Firm* — Leydig, Voit & Mayer, Ltd.

(57) ABSTRACT

A system and method for implementing an acceleration structure are disclosed. The method includes: determining a position of an entity; mapping the position to a 3D (three-dimensional) voxel grid coordinate in the acceleration structure, which comprises a central grid structure and six additional grid structures each comprising a set of voxels; determining a first offset value corresponding to the 3D voxel grid coordinate that corresponds to either the central grid structure or one of the six additional grid structures; and determining a second offset value corresponding to the 3D voxel grid coordinate that corresponds to a particular voxel within either the central grid structure or one of the six additional grid structures corresponding to the first offset value, wherein data corresponding to the entity is stored in memory a location based on the first offset value and the second offset value.

20 Claims, 13 Drawing Sheets

---

Allocate a memory region for voxels of a central grid structure 1102

Allocate six memory regions for voxels of six separate additional grid structures outside the central grid structure 1104

MULTI-DIMENSIONAL ACCELERATION STRUCTURE

FIELD

This disclosure generally relates to computer graphics and, more particularly, to systems and methods related to a multi-dimensional acceleration structure.

BACKGROUND

For three-dimensional (3D) graphics applications, such as video games or animated films, efficient processing of data sometimes involves organizing the data into groups. One advantage of such organizing is that, for certain operations, only data that is relevant to a particular operation is processed, thereby avoiding processing of the entire set of data, which may be very large. Organizing data in this manner can significantly reduce the computational complexity of a given operation and may be of particular use in real-time applications, such as video games.

One class of data structures used to organize data are referred to as "acceleration structures." Taking the context of organizing entities in a 3D space using an acceleration structure as an example, entities in the 3D space can be divided into groups based on their location in the 3D space. An acceleration structure can be used to store data about the entities based on the locations of the entities. When performing a given operation, a look-up can be performed into the acceleration structure to identify the set of entities that may be relevant to the operation, thereby eliminating the need to process other entities that are likely not relevant to the operation. An example may be a collision detection operation, for which the relevant entities are those that are within a certain radius of a given entity in 3D space.

One conventional approach to implementing an acceleration structure is by using a k-d tree (k-dimensional tree) or an octree. A k-d tree is a space-partitioning data structure for organizing points in a k-dimensional space. An octree is a tree data structure in which each internal node has exactly eight children. In the context of dividing up a 3D space, octrees can be used to divide the 3D space into eight octants and recursively subdivide the octants into eight sub-octants.

One drawback of using trees, such as a k-d tree or octree, for an acceleration structure is the computational complexity in populating data into the tree. Another drawback of using trees for acceleration structures is that look-ups into the tree are recursive processes that traverse the tree beginning from a root node, which can be also be computationally expensive depending on the structure of the tree.

As such, there remains a need in the art for a system and method for an improved multi-dimensional acceleration structure.

SUMMARY

Embodiments of the disclosure provide a method, computer-readable storage medium, and device for implementing an acceleration structure. A method includes: determining a position of an entity in a three-dimensional (3D) scene, wherein the position of the entity is determined relative to a location of a camera configured to capture an image of the 3D scene; mapping the position of the entity to a 3D voxel grid coordinate in the acceleration structure, wherein the acceleration structure comprises a central grid structure and six additional grid structures organized around the central grid structure in 3D space, wherein each of the central grid structure and the six additional grid structures comprises a set of voxels; determining a first offset value corresponding to the 3D voxel grid coordinate, wherein the first offset value corresponds to either the central grid structure or one of the six additional grid structures; and determining a second offset value corresponding to the 3D voxel grid coordinate, wherein the second offset value corresponds to a particular voxel within either the central grid structure or one of the six additional grid structures corresponding to the first offset value, wherein data corresponding to the entity is stored in memory a location based on the first offset value and the second offset value.

In some aspects, mapping the position of the entity to the 3D voxel grid coordinate in the acceleration structure comprises determining whether the position of the entity falls within bounds of the central grid structure based on a largest magnitude of coordinate components of the position of the entity relative to the location of the camera.

In one aspect, the position of the entity falls within the bounds of the central grid structure, and the method further comprises applying a linear transform to the position of the entity to transform the position of the entity into the 3D voxel grid coordinate of the central grid structure.

In another aspect, the position of the entity falls outside the bounds of the central grid structure, and the method further comprises: identifying which of the six additional grid structures the position of the entity falls into based on a coordinate axis corresponding to the coordinate component with the largest magnitude and a sign of the coordinate component with the largest magnitude of the position of the entity relative to the location of the camera; calculating two components of the 3D voxel grid coordinate within the identified additional grid structure using the other two components of the position of the entity besides the component corresponding to the coordinate component with the largest magnitude of the position of the entity; and calculating a third component of the 3D voxel grid coordinate within the identified additional grid structure based on a distance between the bounds of the central grid structure to the position of the entity.

In some aspects, calculating the third component of the 3D voxel grid coordinate within the identified additional grid structure is based on a non-linear function.

DETAILED DESCRIPTION

Figure 1:
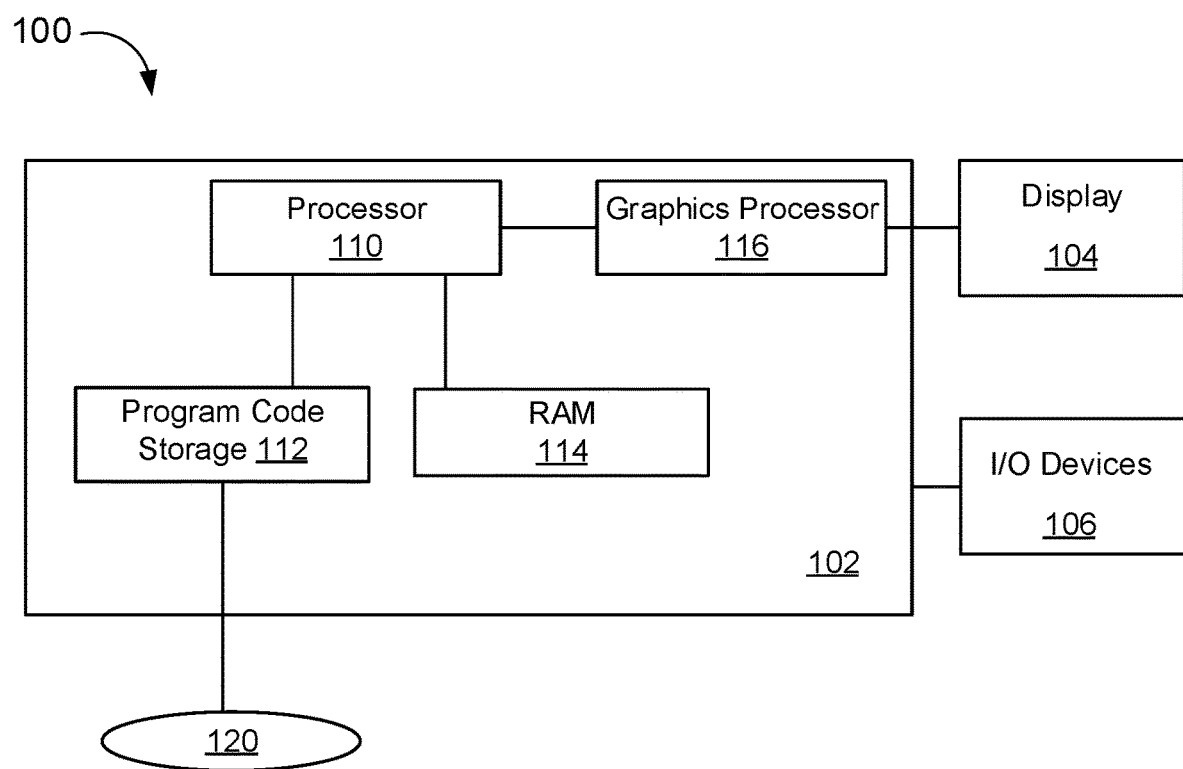
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of the disclosure provide an acceleration structure that provides both fast build times as well as fast lookups. The disclosed embodiments can be used to, for example, partition a 3D space in a way that covers large distances while keeping memory within a strict budget.

In one embodiment, a linear 3D grid structure is defined centered on an observer or camera location. Each sub-element of such a 3D grid structure can be a fixed sized cube (otherwise referred to as a "voxel"). A pre-defined amount of space in memory can be allocated to reference entities that fall within the 3D grid structure. Based on a 3D coordinate position of a given entity relative to a location of the observer or camera (for example, $\{x, y, z\}$ coordinates), information about the entity is populated into the acceleration structure at a particular offset in memory for the voxel representing a volume covered by that 3D coordinate position. For lookups, the acceleration structure allows for an implicit calculation from a 3D position to an offset in memory for the voxel representing a volume covered by that position. The implicit nature of the lookup allows for both fast insertion into the acceleration structure, as well as fast lookup of data in the acceleration structure.

In some embodiments, the linear 3D grid structure can be scaled to cover an area with a user-defined grid voxel size. However, in some embodiments, memory requirements may prohibit this type of structure to be used to provide large scale coverage, e.g., for 3D scenes that extend far in distance in the field of view of the observer/camera.

The disclosed embodiments also provide for a multi-dimensional grid to address this problem. This multi-dimensional grid includes a central linear uniform axis-aligned 3D grid structure centered on the observer or camera (as described above). Outside of the central 3D grid structure, six additional grid structures are defined (i.e., two in the direction of each coordinate axis: left, right, up, down, forward, backward). Memory can be allocated for the central grid structure and each of the six additional grid structures.

In some embodiments, one face of the boundary of each of the six additional grid structures aligns with one face of the boundary of the central grid structure. Four faces of the boundaries of the additional grid structures align with a face of the boundary of one of the other additional grid structures. Within each of the six additional grid structures, a transform from a 3D position into a voxel coordinate for the additional 3D grid structure is done by first employing a 3D vector-to-cube face transform. For example, this can be performed by employing a cube mapping algorithm. This transform defines which of the six additional grid structures the 3D position belongs in and defines a voxel coordinate in that particular additional grid structure. The 3D vector-to-cube face transform also defines two components of the coordinates of each voxel. The third and final component of the voxel coordinate is calculated by a function that grows with distance from the observer/camera. This function can be any strictly increasing function, including non-linear functions, such as the logistic growth function. In summary, this embodiment allows for immediate mapping of a 3D position to a memory offset in the acceleration structure without recursive operations.

The disclosed multi-dimensional grid structure therefore allows for fast population of the acceleration structure, and also allows the acceleration structure to provide coverage over large distances in 3D space and keeping the memory footprint low. For lookups, a memory offset can be determined directly from the location information of the entity, providing fast lookups that do not involve any recursive operations.

In various embodiments, how the data inserted into grid voxels is stored is orthogonal to the disclosed acceleration structure, and the data can be stored in a number of ways, such as linked lists, pre-allocated memory, or as pointers to external allocation structures.

Taking the context of video games as an example, the display of a video game is generally a video sequence presented to a display capable of displaying the video sequence. The video sequence typically comprises a plurality of frames. By showing frames in succession in sequence order, simulated objects appear to move. A game engine typically generates frames in real-time response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frames-per-second video, if one frame represents the scene at t=0 seconds, then the next frame would represent the scene at t=1/60 seconds. In some cases, a frame might represent the scene from t=0 seconds to t=1/60 seconds, but in the simple case, the frame is a snapshot in time.

A "scene" comprises those simulated objects that are positioned in a world coordinate space within a view pyramid, view rectangular prism or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects or entities with some of the objects or entities being animated, in that the objects or entities may appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
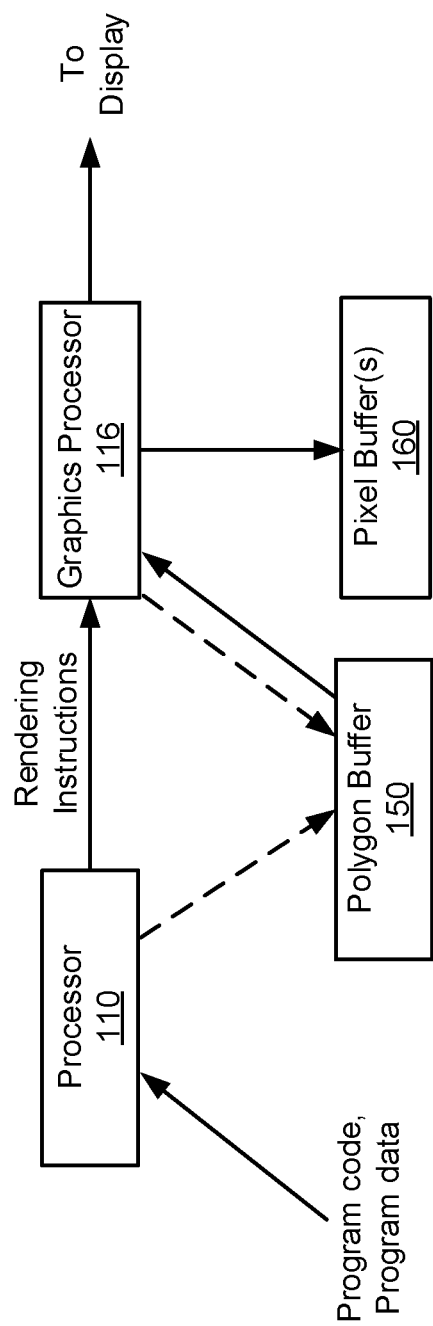
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
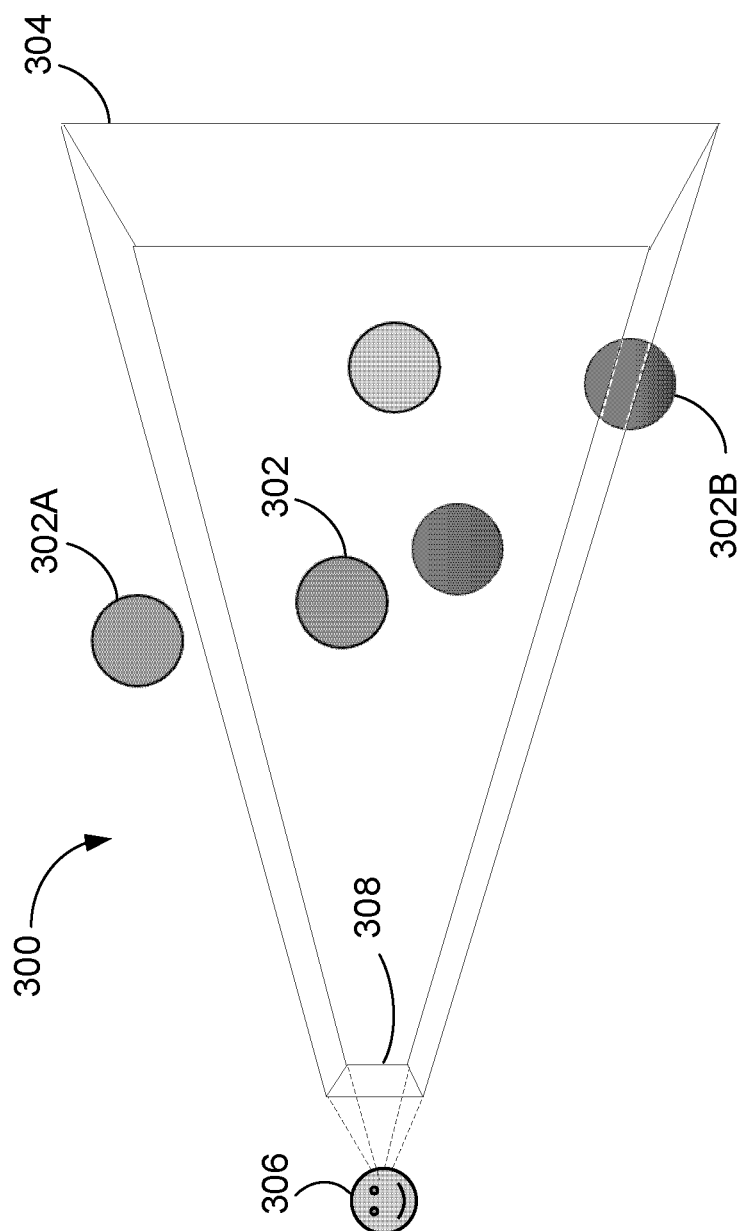
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects, including objects 302, 302A, 302B, for example. Each object can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (i.e., the image represented by screen space 308) can change as the camera 306 moves in 3D space relative to the objects in the scene. Also, the objects can move in the scene 300.

Figure 4B:
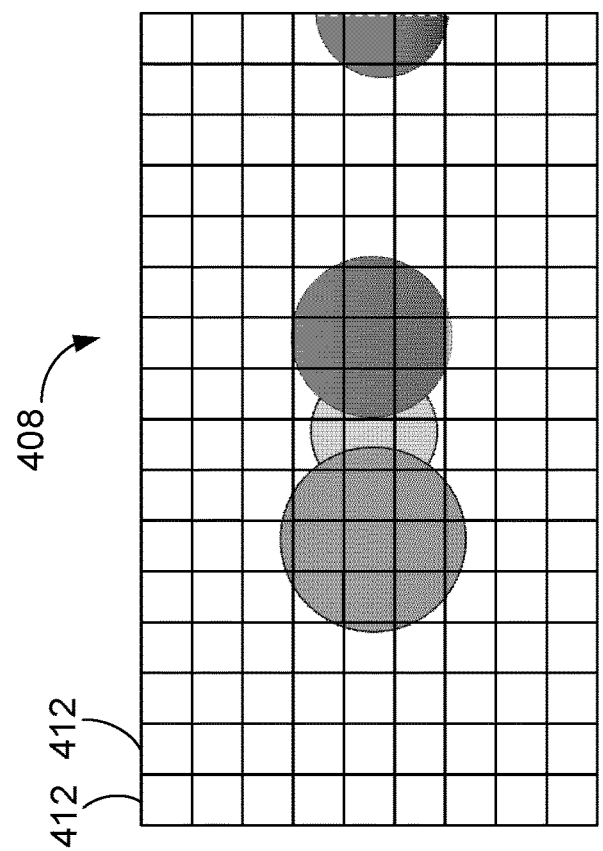
FIG. 4B is an example of an image of a scene, according to one embodiment.
Figure 4A:
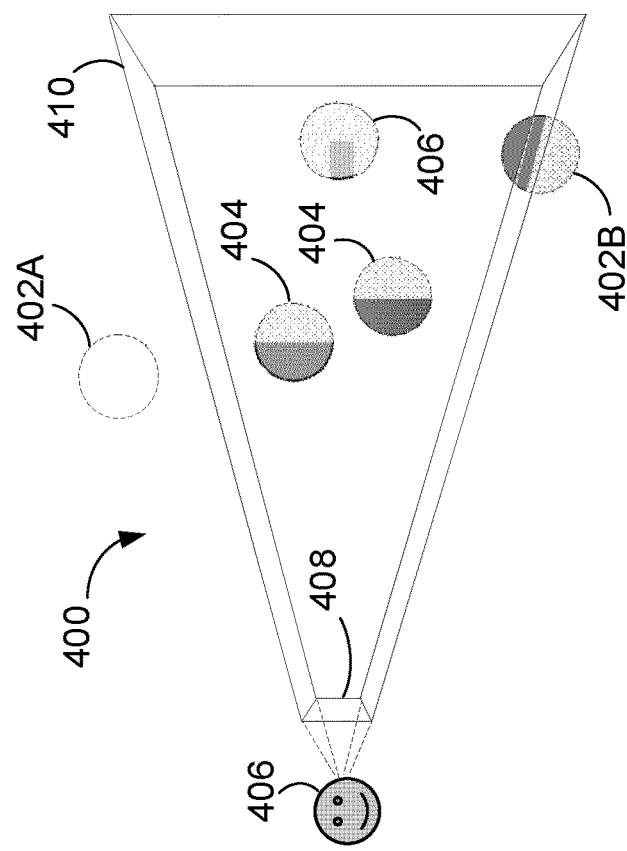
FIG. 4A is a block diagram illustrating rendering of a scene, according to one embodiment.

FIG. 4A is a block diagram illustrating rendering of a scene 400, according to one embodiment. Similar to the diagram shown in FIG. 3, scene 400 includes a plurality of objects. A camera 406 is configured to capture an image of the scene 400, represented in screen space 408. The camera 406 observes the scene 400 through viewport 410.

Various techniques can be used to render the scene 400 in screen space, including rasterization, ray tracing, or other techniques. Rasterization strives to render the pixels as those that are directly visible from the camera 406. In some implementations, rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion 404 of objects that cannot be seen by the camera 406. In some embodiments, depth testing can be performed to remove, on a per pixel basis in screen space 408, portions 406 of objects that are occluded by other objects.

When rasterization is complete, an image of scene in screen space 408 is generated. In some embodiments, pixel density of the screen space 408 can also result in information loss about the objects in the scene 400.

FIG. 4B is an example of an image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, properties of the object (e.g., transparency or translucency), and/or surface roughness information, etc. The result of rasterization is, therefore, a 2D image of the 3D scene.

Although rendering has been described herein using rasterization, other embodiments may involve rendering a scene using other techniques, such as ray tracing, ray casting, radiosity, or any other rendering technique or combination thereof. In some embodiments, rendering or other graphics operations are performed based on the location of entities (e.g., objects) in the 3D space. Thus, it may be useful to generate an acceleration structure that organizes the entities in the 3D to be accessible by a graphics operation, such as a rendering operation.

Figure 5:
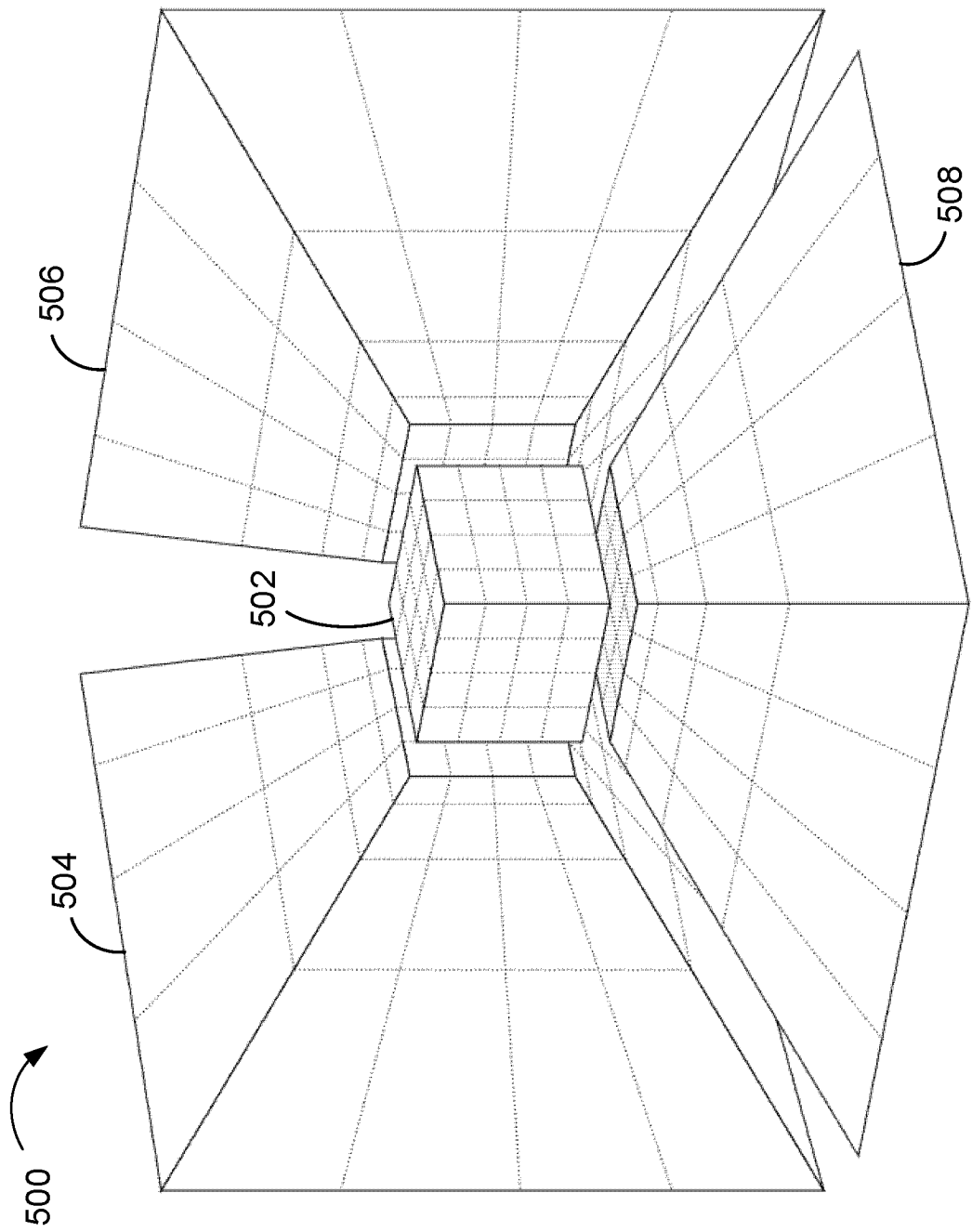
FIG. 5 is a block diagram illustrating a representation of an acceleration structure for a 3D space, according to one embodiment.

FIG. 5 is a block diagram illustrating a representation of an acceleration structure 500 for a 3D space, according to one embodiment. The acceleration structure 500 includes a central grid structure 502 and additional grid structures 504, 506, 508. In one embodiment, six additional grid structures are included in the acceleration structure 500 besides the central grid structure 502, although only three additional grid structures 504, 506, 508 are shown in FIG. 5 for clarity.

As described, a 3D space of a scene can extend in three directions $\{x, y, z\}$ from a location of a camera or observer. In the acceleration structure 500, a camera location (not labeled in FIG. 5) is in the center of the central grid structure 502. In the example shown, the central grid structure 502 comprises a 4×4×4 grid of voxels. In other examples, any number of voxels can be included in the central grid structure 502 can be used. For example, the central grid structure 502 may comprises a 64×64×64 grid of voxels. Also, each of the voxels of the the central grid structure 502 can have a configurable size in 3D space.

In some embodiments, the central grid structure 502 is a cube, as shown in FIG. 5. The size of each voxel (in terms of how much distance/space the voxel covers in 3D space) is also configurable. In some embodiments, the central grid structure 502 may be a rectangular structure (e.g., N×M×P voxels). In some embodiments, the central grid structure 502 may be a cube structure (e.g., N×N×N voxels, as shown where N=4). In other embodiments, the central grid structure 502 may have a spherical shape or any other shape.

In one embodiment, each of additional grid structures 504, 506, 508 of the acceleration structure 500 has the same resolution as the central grid structure 502, i.e., each additional grid structure has the same number of voxel in each dimension as the central grid structure 502. In the example shown in FIG. 5, each of the additional grid structures 504, 506, 508 also has a resolution of 4×4×4 voxels. However, as shown in FIG. 5, the shape of each voxel of the additional grid structures 504, 506, 508 has been transformed by a non-linear transformation so that the additional grid structures 504, 506, 508 can cover a larger distance in 3D space. The respective additional grid structures 504, 506, 508 expand with a non-linear function with distance in each cardinal direction (e.g., x, y, z) from a location of a camera (i.e., in the center of the central grid structure 502). The respective additional grid structures 504, 506, 508 expand with a non-linear function with distance in each cardinal direction (e.g., x, y, z) from expand in either the positive or negative directions relative to a location of the camera/observer (i.e., in the center of the central grid structure 502) in each cardinal direction. As such, although the additional grid structures can cover large distances away from the location of the camera/observer, from the perspective of the camera/observer, the voxels of the additional grid structures cover the same screen space area as the voxels of the central grid structure 502. This provides the same coverage in screen space, regardless of distance from the camera/observer.

Figure 6:
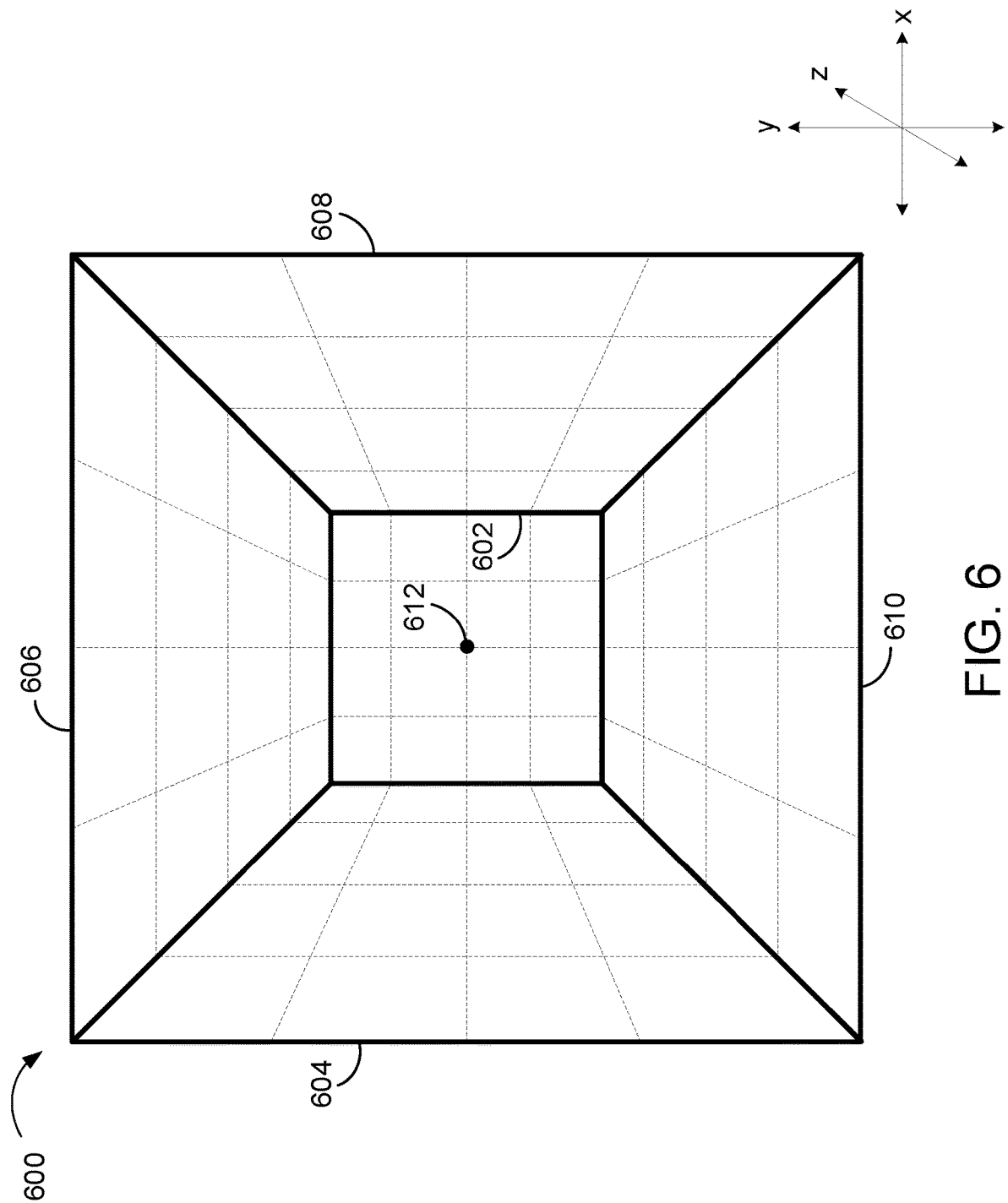
FIG. 6 is a block diagram illustrating a cross-section of a representation of an acceleration structure for a 3D space, according to one embodiment.

FIG. 6 is a block diagram illustrating a cross-section of a representation of an acceleration structure 600 for a 3D space, according to one embodiment. The acceleration structure 600 includes a central grid structure 602 and additional grid structures 604, 606, 608, 610. In one embodiment, six additional grid structures are included in the acceleration structure 600 besides the central grid structure 602, although only four additional grid structures 604, 606, 608, 610 are shown in the cross-section of the acceleration structure 600 in FIG. 6. In the example shown, additional grid structure 604 represents the negative X-direction relative a location of a camera 612, additional grid structure 608 represents the positive X-direction relative a location of the camera 612, additional grid structure 610 represents the negative Y-direction relative a location of the camera 612, and additional grid structure 606 represents the positive Y-direction relative a location of the camera 612. Two more additional grid structures would be included for the negative-Z direction relative a location of the camera 612 (i.e., an additional grid structure oriented coming out of the page) and the positive-Z direction relative a location of the camera 612 (i.e., an additional grid structure oriented going in the page).

As shown, each of the additional grid structures is aligned with the outer bounds of the central grid structure. Also, the additional grid structures are aligned with adjacent additional grid structures. In this manner, the central grid structure and the additional grid structures that comprise the acceleration structure cover continuous 3D space in all directions from a location of camera/observer located at the center of the central grid structure.

Figure 7:
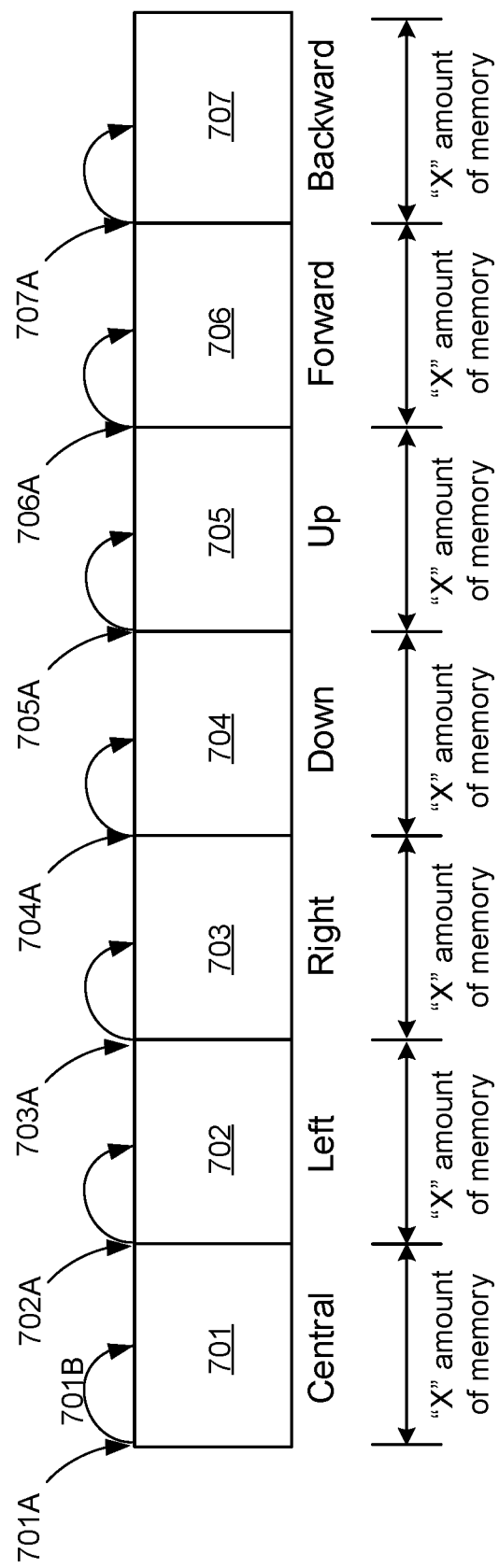
FIG. 7 is a block diagram illustrating memory allocation for an acceleration structure for a 3D space, according to one embodiment.

FIG. 7 is a block diagram illustrating memory allocation for an acceleration structure for a 3D space, according to one embodiment. In some embodiments, a pre-defined amount of memory is allocated for the acceleration structure, such as the acceleration structure 500 shown in FIG. 5. Separate memory regions 701-707 are allocated for the seven different grid structures of the acceleration structure, including a central grid structure and six additional grid structures that make up the acceleration structure.

In one embodiment, each of the central grid structure and the six additional grid structures is allocated an amount of memory based on the number of voxels in the respective grid structure. Taking the acceleration structure 500 in FIG. 5 as an example, each of the central grid structure and the additional grid structures has a resolution of 4×4×4 voxels. Thus, the amount of memory allocated to the central grid structure (e.g., "x" amount of memory in FIG. 7) is the same as the amount of memory allocated to each of the six additional grid structures (e.g., also "x" amount of memory for each additional grid structure), for a total of 7x memory.

In an embodiment where the central grid structure has the same number of voxels as each of the six additional grid structures, each of the seven separate memory regions 701-707 of memory that is allocated has the same size. In other embodiments, the number of voxels in each additional grid structure may be less than the number of voxels in the central grid structure. In such a case, the amount of memory allocated to each of the additional grid structures may be less than the amount of memory allocated for the central grid structure.

In the example shown in FIG. 7, memory region 701 corresponds to the central grid structure, memory region 702 corresponds to the left additional grid structure (negative X direction), memory region 703 corresponds to the right additional grid structure (positive X direction), memory region 704 corresponds to the down additional grid structure (negative Y direction), memory region 705 corresponds to the up additional grid structure (positive Y direction), memory region 706 corresponds to the backward additional grid structure (negative Z direction), and memory region 707 corresponds to the forward additional grid structure (positive Z direction). In other implementations, the different memory regions 701-707 can be organized differently and in a different order relative to one another. Also, in some embodiments, the different memory regions 701-707 can occupy a contiguous block of memory or can occupy non-contiguous blocks of memory.

As described, depending on the shape and resolution (e.g., dimensions) of the central grid structure and the six additional grid structures, the memory regions 701-707 could have different sizes in terms of memory allocation. However, in any of these embodiments, since the size and resolution of the central grid structure and the six additional grid structures in known in advance, the amount of memory allocated to the acceleration structure is also known in advance (i.e., configurable based on the size and resolution of the central grid structure and the six additional grid structures, but nonetheless known given the known resolution). This is different from other acceleration structures, such as k-d trees or octrees, for which the amount of memory allocated for those other acceleration structures depends on how much data is in the acceleration structure. In the disclosed embodiments, the amount of memory allocated is predetermined based on the size and resolution of the grid structures that compose the acceleration structure.

In one embodiment, each of the separate memory regions 701-707 is associated with a first offset value 701A-707A, respectively, that provides a memory offset (e.g., a pointer) to the given memory region.

To access a particular location within a given memory region (e.g., within memory region 701), the first offset value for that region is first identified (e.g., first offset value 701A for memory region 701). Then, a second offset value identifies a particular location within the given memory region (e.g., for region 701, second offset value 701B). As described, each grid structure has a pre-determined number of voxels. For example, in FIG. 5, each grid structure comprises 4×4×4=64 voxels. As such, 64 separate locations can be identified by the second offset value for a given memory region based on which voxel the second offset value identifies.

In one embodiment, when data corresponding to an entity is being inserted into the acceleration structure, a processor first determines which of the seven grid structures the entity falls into (i.e., the central grid structure or one of the six additional grid structures). This can be determined by identifying a magnitude (e.g., absolute value) of a largest coordinate component of the position of the entity. If the magnitude of the largest coordinate component is such that the entity falls within the central grid structure, the processor determines a first memory offset that corresponds to a memory region for the central grid structure. The processor can then determine a second memory offset into the memory region for the central grid structure based on the particular voxel within the central grid structure in which the entity falls.

If the magnitude of the largest coordinate component of the position of the entity is such that the entity falls outside the central grid structure, the processor determines which of the six additional grid structures the entity falls into based on which coordinate component (i.e., x, y, or z) of the position of the entity has the largest magnitude, and the sign (positive or negative) of this component. Based on which of the six additional grid structures the entity falls into, a first memory offset that corresponds to that particular additional grid structure is identified (e.g., first offset value 702A, 703A, 704A, 705A, 706A, or 707A in FIG. 7). The processor can then determine a second memory offset into the memory region for the particular additional grid structure based on the particular voxel within the particular additional grid structure in which the entity falls. Additional detail about this aspect is further provided below.

Once a first offset value (i.e., identifying the particular grid structure) and a second offset value (i.e., identifying a location within the identified particular grid structure) are determined, data about the entity can be stored at a location in memory based on the first offset value and the second offset value. For lookups, once a 3D position of an entity is determined (e.g., relative to a position of the camera), the first offset value and the second offset value can be determined directly from the 3D position to identify where in memory to look for the data corresponding to that entity. As such, the 3D position provides an implicit offset into memory for data about the entity, and no recursive or iterative process is needed for look-up, which differs from look-ups using conventional acceleration structures, such as k-d trees or octrees.

Figure 8:
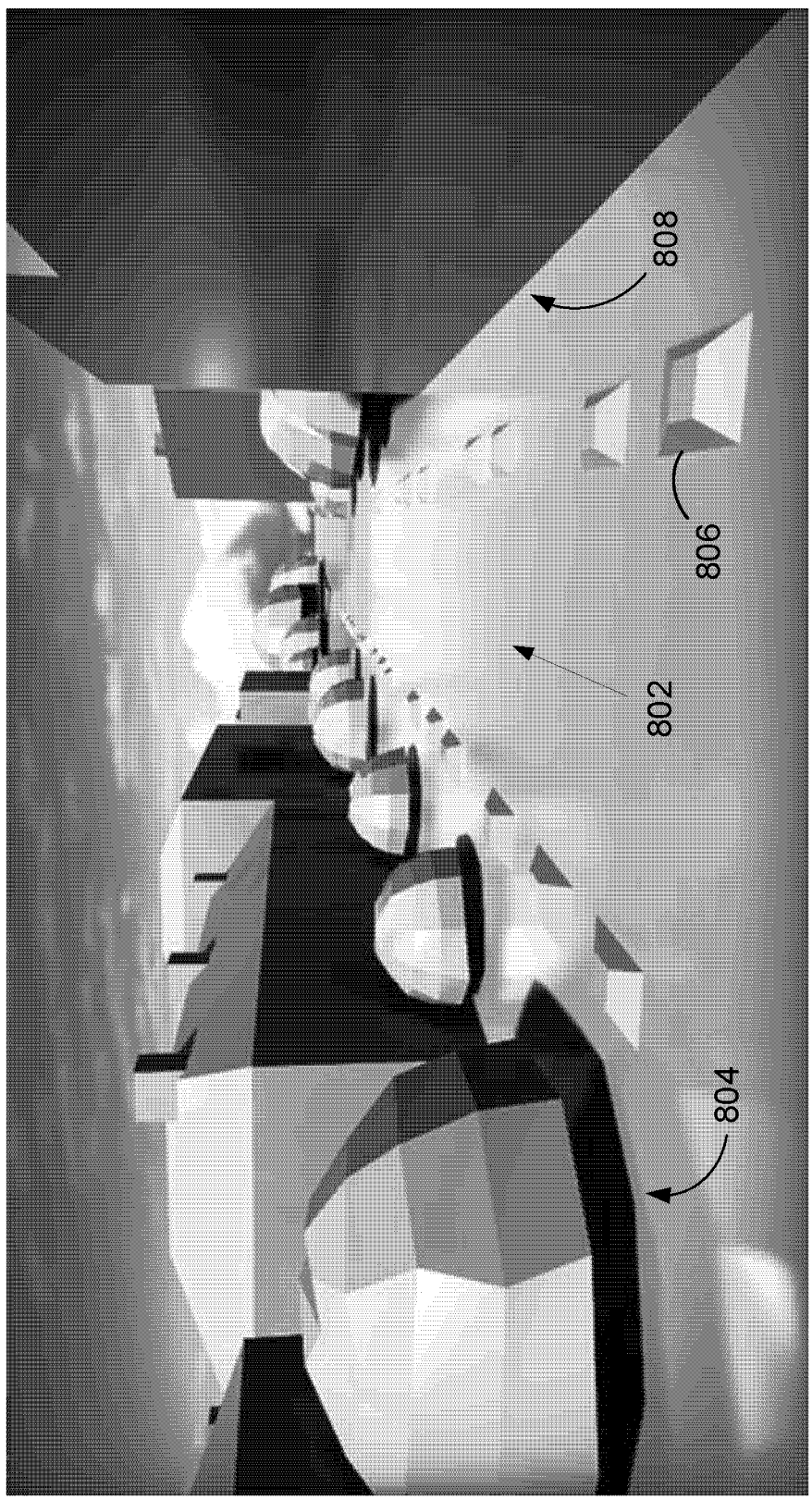
FIG. 8 is an example of a rendered image, according to one embodiment.

FIG. 8 is an example of a rendered image, according to one embodiment. The rendered image shows pathway 802 with several dome-like objects 804 along the left side of the pathway 802. Also shown is a wall 808 on the right side of the pathway 802 and some surface features 806 along the pathway 802, among other objects and surfaces shown in the rendered image.

Figure 9:
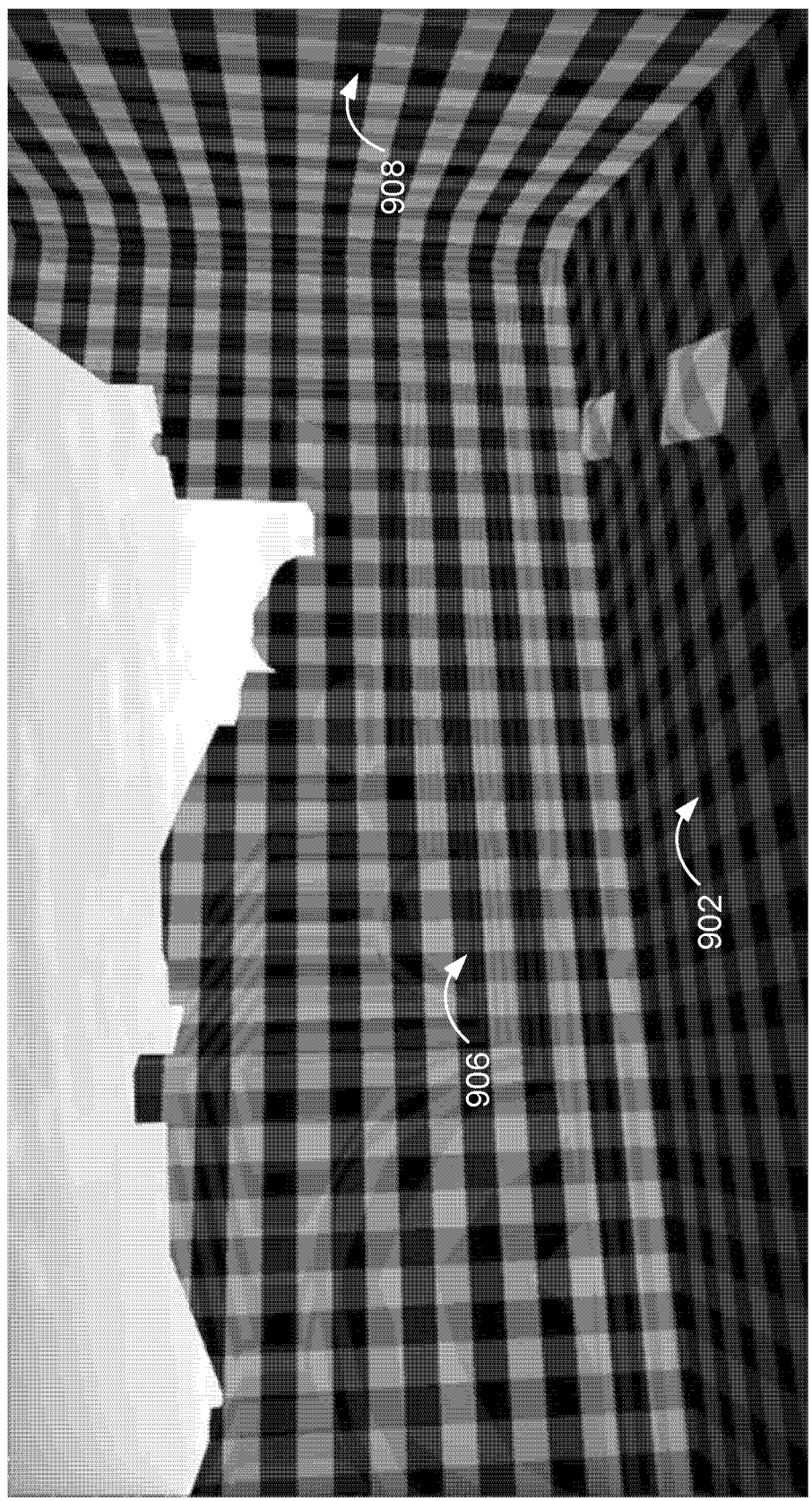
FIG. 9 is an example of a representation of an acceleration structure overlaid onto a rendered image, in one embodiment.

FIG. 9 is an example of a representation of an acceleration structure overlaid onto a rendered image, in one embodiment. In FIG. 9, a grid of the acceleration structure (as viewed from the point of view of the camera) is shown. In this example, a bottom plane 902 is a slice of a central grid structure, as described above. A wall 908 is also a slice of the central grid structure. The view looking forward at grid 906 appears to be a slice of the central grid structure, but is actually voxels of one of the additional grid structures (i.e., the forward-looking, positive Z additional grid structure). The voxels in grid 906 appear two-dimensional in FIG. 9, but depending on distance from the camera, the different checkerboard areas of the grid 906 actually cover different voxels of the additional grid structure.

Figure 10:
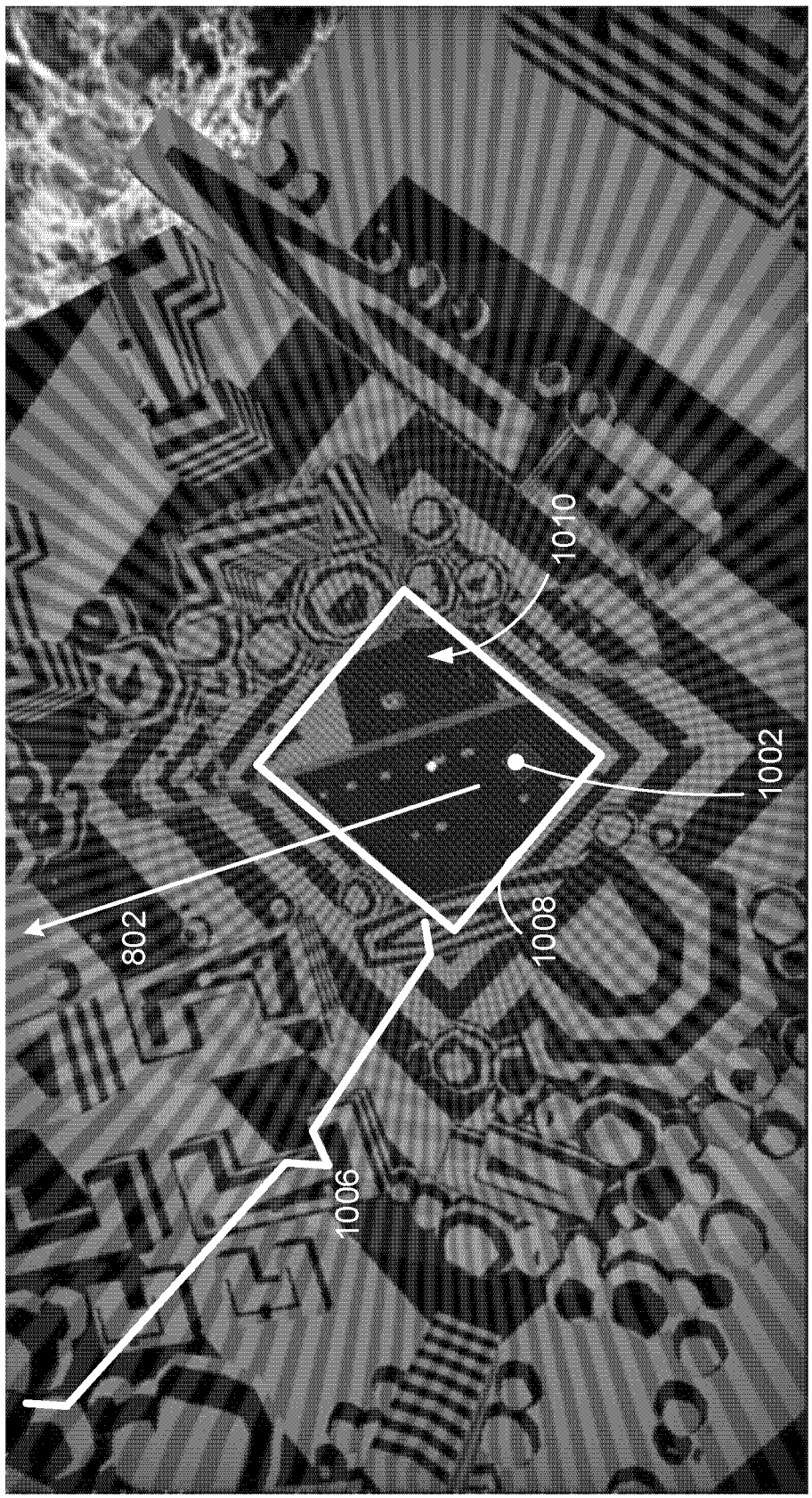
FIG. 10 is a top-down view of a scene with a representation of an acceleration structure overlaid onto the scene, in one embodiment.

FIG. 10 is a top-down view of a scene with a representation of an acceleration structure overlaid onto the scene, in one embodiment. The top-down view in FIG. 10 represents the scene shown in FIGS. 8-9 looking down from above. Camera location 1002 and the pathway 802 (from FIG. 8) is shown.

In the example in FIG. 10, a slice 1008 of the central grid structure is shown in the middle of the figure (i.e., slice 1008 is represented by a white square). A portion of building 1010 to the right of the camera location 1002 (relative to the view shown in FIG. 8) is covered by a part of the slice 1008 of central grid structure as well. The voxels covering the pathway 802 are part of both the central grid structure (i.e., near the camera location 1002) and one of the additional grid structures (i.e., outside the slice 1008 representing the bounds of the central grid structure). As shown in FIG. 10, the checkerboard areas of the grid 906 in FIG. 9 that looked regular from the point of view of the camera, are actually not two-dimensional, but cover different areas of the additional grid structure by depth, which is represented by the differing lengths of alternating colors 1006 in the direction of the additional grid structure for distances further away from the camera location 1002.

Figure 11:
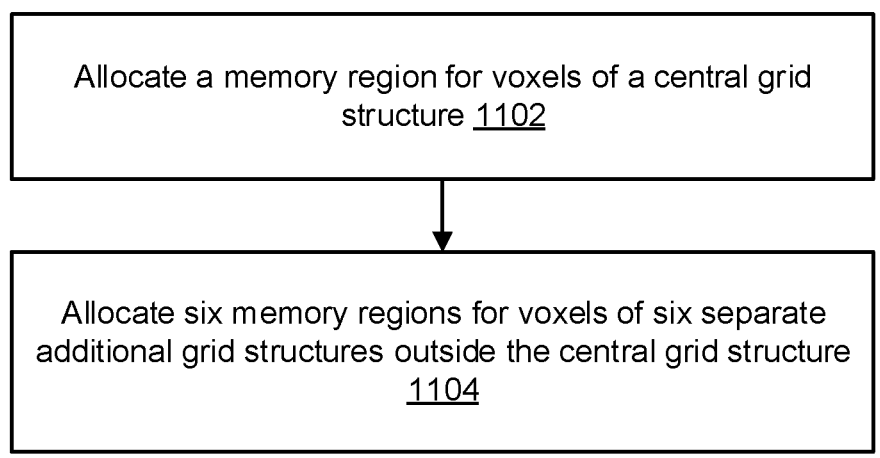
FIG. 11 is a flow diagram of method steps for allocating memory for an acceleration structure, in one embodiment.

FIG. 11 is a flow diagram of method steps for allocating memory for an acceleration structure, in one embodiment. In various implementations, the method can be performed by the processor 110, the graphics processor 116, or a combination of the processor 110 and the graphics processor 116.

As shown, the method begins at step 1102, where a processor allocates a memory region for voxels of a central grid structure. At step 1104, the processor allocates six memory regions for voxels of six separate additional grid structures outside the central grid structure. As described, the six additional grid structures are organized around the central grid structure in the six cardinal directions (i.e., left, right, up, down, forward, and backward) relative to the central grid structure.

As described, in one embodiment, the central grid structure and each of six separate additional grid structures may have the same number of voxels per dimension. Thus, the respective memory regions for the central grid structure and each of six separate additional grid structures may have same size (i.e., a total of 7X memory, relative to a size X of the memory region for the central grid structure). In other embodiments, the central grid structure may have a different number of voxels than the additional grid structures in one or more dimensions, in which case the memory requirements may be different. In further embodiments, one or more of the additional grid structures may have a different number of voxels in one or more dimensions than other additional grid structures.

In some embodiments, the memory regions are contiguously allocated. In other embodiments, the memory regions are non-contiguously allocated. Each memory region is associated with a first offset value to access the respective memory region. Within each memory region, a second offset value corresponds to a particular voxel of the grid structure corresponding to that memory region.

Figure 12:
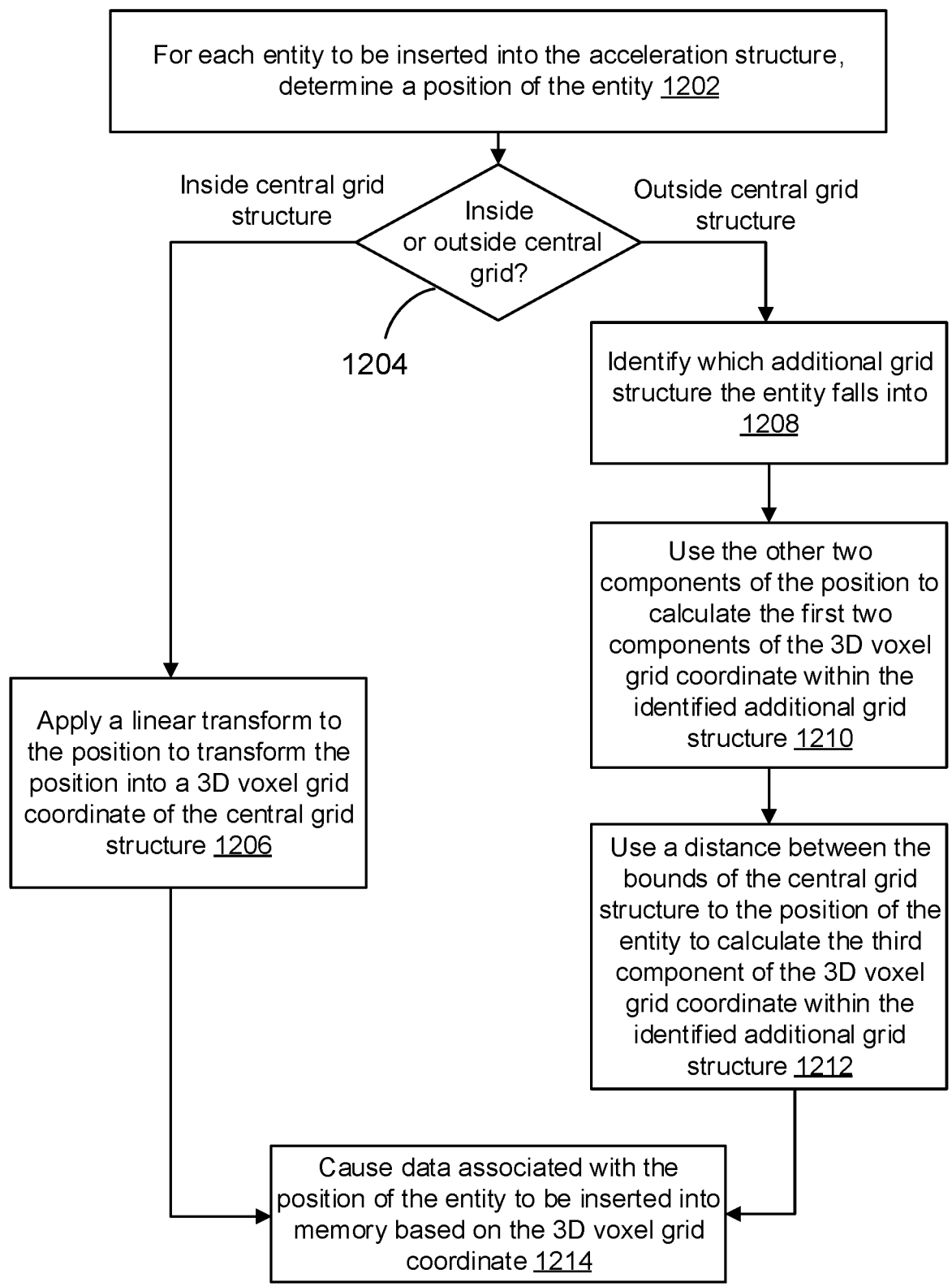
FIG. 12 is a flow diagram of method steps for inserting data into an acceleration structure, in one embodiment.

FIG. 12 is a flow diagram of method steps for inserting data into an acceleration structure, in one embodiment. In various implementations, the method can be performed by the processor 110, the graphics processor 116, or a combination of the processor 110 and the graphics processor 116.

As shown, the method begins at step 1202, where, for each entity to be inserted into the acceleration structure, a processor determines a position of the entity in the 3D scene. In a 3D space, the position is parameterized by x-, y-, and z-coordinate components relative to a location of a camera. As described, the acceleration structure includes a central grid structure and six additional grid structures made up of voxels. For a given entity, the position of the entity is determined relative to a location of a camera. The largest magnitude (e.g., absolute value) of the coordinate components of the position of the entity may also be determined. The sign of the coordinate component with the largest magnitude of the position of the entity may also be determined.

At step 1204, the processor determines whether the position of the entity falls inside (within) or outside the bounds of the central grid structure of the acceleration structure. The central grid structure is made up of a series of voxels. The size of the central grid structure (in terms of x-, y-, and z-coordinate value that it covers in 3D space) is known based on the number of voxels and the size of each voxel of the central grid structure.

If the largest magnitude of the coordinate components of the position of the entity is less than the size of the central grid structure in the direction of the largest magnitude of the coordinate components, then the processor determines that the position of the entity falls inside the bounds of the central grid structure. The method then proceeds to step 1206, where the processor applies a linear transform to the position of the entity to transform the position of the entity into a 3D voxel grid coordinate of the central grid structure.

Given that the entity falls within the central grid structure, a first offset value in memory is identified corresponding to the central grid structure. Then, once the 3D voxel grid coordinate within the central grid structure is determined at step 1206, a second offset value is identified corresponding to the voxel within the central grid structure corresponding to the determined 3D voxel grid coordinate within the central grid structure.

If the largest magnitude of the coordinate components of the position of the entity is greater than the size of the central grid structure in the direction of the largest magnitude of the coordinate components, then the position of the entity falls outside the bounds of the central grid structure. The method then proceeds to step 1208, where the processor identifies which additional grid structure (i.e., of the six additional grid structures) the entity falls into. As described, the largest magnitude of the coordinate components of the position, as well as the sign of this component, of the entity is determined. A predefined mapping from the coordinate axis corresponding to the coordinate component with the largest magnitude, and the sign of this component to additional grid structure is used to identify which additional grid structure the entity falls into.

At step 1210, the processor uses the other two coordinate components of the position of the entity (besides the coordinate component with the largest magnitude) to calculate the first two components of a 3D voxel grid coordinate within the identified additional grid structure. In one embodiment, calculating the first two components of the 3D voxel grid coordinate is done similarly to cube mapping. Each of these two components is calculated by dividing the corresponding coordinate component of the position of the entity with the coordinate component with the largest magnitude of the position of the entity, and applying a linear transform to the result.

At step 1212, the processor uses a distance between the bounds of the central grid structure to the position of the entity to calculate the third component of the 3D voxel grid coordinate within the identified additional grid structure. In various embodiments, any strictly increasing function can be used, including a linear function or a non-linear function. To cover a large distance in 3D space using the additional grid structure, a non-linear function can be used to calculate the third 3D voxel grid coordinate within the additional grid structure. One example of such a non-linear function is a logistic growth function.

Given that the entity falls into one of the additional grid structures identified at step 1208, a first offset value is identified corresponding to the identified additional grid structure. Then, once the 3D voxel grid coordinate within the identified additional grid structure is determined at step 1212, a second offset value is identified corresponding to the voxel within the identified additional grid structure corresponding to the determined 3D voxel grid coordinate within the identified additional grid structure.

At step 1214, the processor causes data associated with the position of the entity to be inserted into memory based on the 3D voxel grid coordinate (i.e., identified at either step 1206 or 1212). As described, a first offset value identifies the memory region of the corresponding grid structure (i.e., either the central grid structure or one of the six additional grid structures). Then, a second offset value identifies a particular voxel within the corresponding grid structure.

In various embodiments, the data associated with the position of the entity can be stored in various ways depending on the implementation. For a given entity, the data may be lighting data, color data, position data, or any other data. The data may also be a pointer to another memory location that stores additional metadata about the entity. Various implementations may involve inked lists, a pre-allocated linear data structure, or a pointer to another data structure elsewhere in memory.

In various embodiments, the method of FIG. 12 can be repeated for other entities. In one embodiment, all entities in a scene are processed to insert them into the acceleration structure. In another embodiment, the set of entities visible within a viewport of a camera are processed to insert them into the acceleration structure. In yet another embodiment, the set of entities that are within a certain distance of a given entity are processed to insert them into the acceleration structure.

Figure 13:
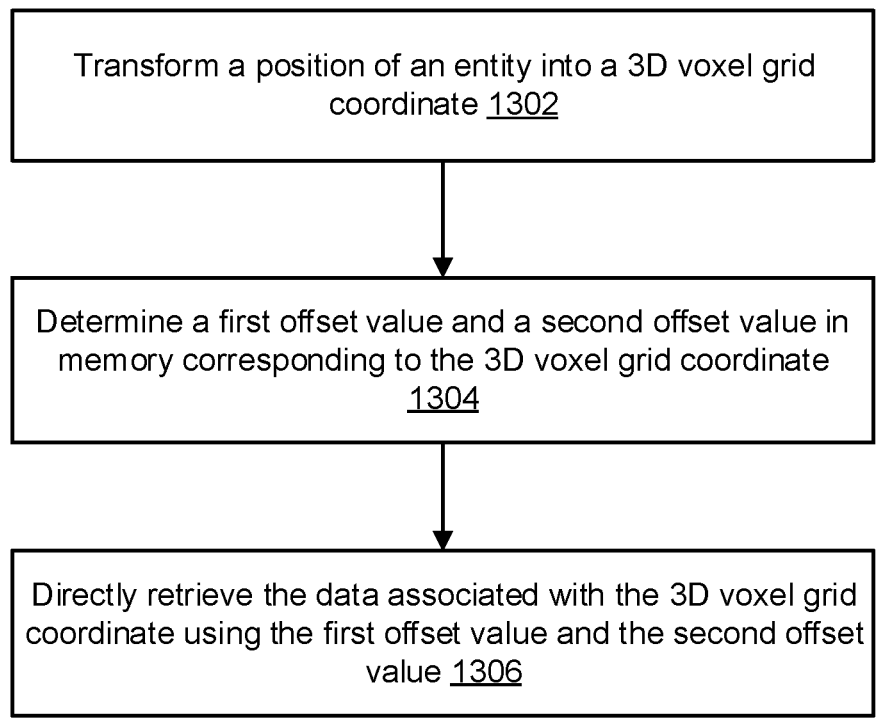
FIG. 13 is a flow diagram of method steps for retrieving data from an acceleration structure, in one embodiment.

FIG. 13 is a flow diagram of method steps for retrieving data from an acceleration structure, in one embodiment. In various implementations, the method can be performed by the processor 110, the graphics processor 116, or a combination of the processor 110 and the graphics processor 116.

As shown, the method begins at step 1302, where a processor transforms a position of an entity into a 3D voxel grid coordinate. This process is described in FIG. 12. The position of the entity is determined relative to a position of the camera. If the position of the entity falls within the bounds of a central grid structure of the acceleration structure, then the 3D voxel grid coordinate can be determined using the technique of step 1206. If the position of the entity falls outside the bounds of a central grid structure of the acceleration structure (i.e., falls within one of the six additional grid structures outside the central grid structure), then the 3D voxel grid coordinate can be determined using the technique of steps 1208-1210-1212.

At step 1304, the processor determines a first offset value and a second offset value in memory corresponding to the 3D voxel grid coordinate. As described, the first offset value corresponds to grid structure to which the 3D voxel grid coordinate is associated with (i.e., the central grid structure or one of the six additional grid structures). The second offset value corresponds to a particular voxel within the identified additional grid structure corresponding to the 3D voxel grid coordinate within the identified additional grid structure.

At step 1306, the processor directly retrieves the data associated with the 3D voxel grid coordinate using the first offset value and the second offset value. In this manner, the location in memory for the look-up can be deterministically identified based on the position of the entity. There is no iterative or recursive process needed to identify the memory location, which provides an advantage over other acceleration structure looks ups, such as with k-d trees or octrees.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for implementing an acceleration structure, the method comprising:
    determining, by one or more processors, a position of an entity in a three-dimensional (3D) scene, wherein the position of the entity is determined relative to a location of a camera configured to capture an image of the 3D scene;
    mapping, by the one or more processors, the position of the entity to a 3D voxel grid coordinate in the acceleration structure, wherein the acceleration structure comprises a central grid structure and six additional grid structures organized around the central grid structure in 3D space, wherein each of the central grid structure and the six additional grid structures comprises a set of voxels;
    determining, by the one or more processors, a first offset value corresponding to the 3D voxel grid coordinate, wherein the first offset value corresponds to either the central grid structure or one of the six additional grid structures; and
    determining, by the one or more processors, a second offset value corresponding to the 3D voxel grid coordinate, wherein the second offset value corresponds to a particular voxel within either the central grid structure or one of the six additional grid structures corresponding to the first offset value, wherein data corresponding to the entity is stored in memory a location based on the first offset value and the second offset value.

2. The method according to claim 1, wherein mapping the position of the entity to the 3D voxel grid coordinate in the acceleration structure comprises:
    determining whether the position of the entity falls within bounds of the central grid structure based on a largest magnitude of coordinate components of the position of the entity relative to the location of the camera.

3. The method according to claim 2, wherein the position of the entity falls within the bounds of the central grid structure, the method further comprising:
    applying a linear transform to the position of the entity to transform the position of the entity into the 3D voxel grid coordinate of the central grid structure.

4. The method according to claim 2, wherein the position of the entity falls outside the bounds of the central grid structure, the method further comprising:
    identifying which of the six additional grid structures the position of the entity falls into based on a coordinate axis corresponding to the coordinate component with the largest magnitude and a sign of the coordinate component with the largest magnitude of the position of the entity relative to the location of the camera;
    calculating two components of the 3D voxel grid coordinate within the identified additional grid structure using the other two components of the position of the entity besides the component corresponding to the coordinate component with the largest magnitude of the position of the entity; and
    calculating a third component of the 3D voxel grid coordinate within the identified additional grid structure based on a distance between the bounds of the central grid structure to the position of the entity.

5. The method according to claim 4, wherein calculating the third component of the 3D voxel grid coordinate within the identified additional grid structure is based on a non-linear function.

6. The method according to claim 1, wherein the central grid structure and each of the six additional grid structures comprises a same number of voxels in each dimension, and wherein a same amount of memory is allocated to the central grid structure and each of the six additional grid structures.

7. The method according to claim 1, further comprising:
    storing the data corresponding to the entity in the memory based on the first offset value and the second offset value.

8. The method according to claim 1, further comprising:
    retrieving the data corresponding to the entity from the memory based on the first offset value and the second offset value.

9. A non-transitory computer-readable storage medium storing instructions that, when executed by one or more processors, causes a computing device to implement an acceleration structure, by performing the steps of:
    determining a position of an entity in a three-dimensional (3D) scene, wherein the position of the entity is determined relative to a location of a camera configured to capture an image of the 3D scene;
    mapping the position of the entity to a 3D voxel grid coordinate in the acceleration structure, wherein the acceleration structure comprises a central grid structure and six additional grid structures organized around the central grid structure in 3D space, wherein each of the central grid structure and the six additional grid structures comprises a set of voxels;
    determining a first offset value corresponding to the 3D voxel grid coordinate, wherein the first offset value corresponds to either the central grid structure or one of the six additional grid structures; and determining a second offset value corresponding to the 3D voxel grid coordinate, wherein the second offset value corresponds to a particular voxel within either the central grid structure or one of the six additional grid structures corresponding to the first offset value, wherein data corresponding to the entity is stored in memory a location based on the first offset value and the second offset value.

10. The computer-readable storage medium according to claim 9, wherein mapping the position of the entity to the 3D voxel grid coordinate in the acceleration structure comprises:

determining whether the position of the entity falls within bounds of the central grid structure based on a largest magnitude of coordinate components of the position of the entity relative to the location of the camera.

11. The computer-readable storage medium according to claim 10, wherein the position of the entity falls within the bounds of the central grid structure, the steps further comprising:

applying a linear transform to the position of the entity to transform the position of the entity into the 3D voxel grid coordinate of the central grid structure.

12. The computer-readable storage medium according to claim 10, wherein the position of the entity falls outside the bounds of the central grid structure, the steps further comprising:

identifying which of the six additional grid structures the position of the entity falls into based on a coordinate axis corresponding to the coordinate component with the largest magnitude and a sign of the coordinate component with the largest magnitude of the position of the entity relative to the location of the camera;

calculating two components of the 3D voxel grid coordinate within the identified additional grid structure using the other two components of the position of the entity besides the component corresponding to the coordinate component with the largest magnitude of the position of the entity; and calculating a third component of the 3D voxel grid coordinate within the identified additional grid structure based on a distance between the bounds of the central grid structure to the position of the entity.

13. The computer-readable storage medium according to claim 12, wherein calculating the third component of the 3D voxel grid coordinate within the identified additional grid structure is based on a non-linear function.

14. The computer-readable storage medium according to claim 9, wherein the central grid structure and each of the six additional grid structures comprises a same number of voxels in each dimension, and wherein a same amount of memory is allocated to the central grid structure and each of the six additional grid structures.

15. The computer-readable storage medium according to claim 9, the steps further comprising:

storing the data corresponding to the entity in the memory based on the first offset value and the second offset value.

16. The computer-readable storage medium according to claim 9, the steps further comprising:

retrieving the data corresponding to the entity from the memory based on the first offset value and the second offset value.

17. A device for implementing an acceleration structure, the device comprising:

a memory storing instructions; and one or more processors configured to the execute the instructions to cause the device to:

determine a position of an entity in a three-dimensional (3D) scene, wherein the position of the entity is determined relative to a location of a camera configured to capture an image of the 3D scene;

map the position of the entity to a 3D voxel grid coordinate in the acceleration structure, wherein the acceleration structure comprises a central grid structure and six additional grid structures organized around the central grid structure in 3D space, wherein each of the central grid structure and the six additional grid structures comprises a set of voxels;

determine a first offset value corresponding to the 3D voxel grid coordinate, wherein the first offset value corresponds to either the central grid structure or one of the six additional grid structures; and determine a second offset value corresponding to the 3D voxel grid coordinate, wherein the second offset value corresponds to a particular voxel within either the central grid structure or one of the six additional grid structures corresponding to the first offset value, wherein data corresponding to the entity is stored in memory a location based on the first offset value and the second offset value.

18. The device according to claim 17, wherein mapping the position of the entity to the 3D voxel grid coordinate in the acceleration structure comprises:

determining whether the position of the entity falls within bounds of the central grid structure based on a largest magnitude of coordinate components of the position of the entity relative to the location of the camera.

19. The device according to claim 18, wherein the position of the entity falls within the bounds of the central grid structure, and executing the instructions further causes the device to:

apply a linear transform to the position of the entity to transform the position of the entity into the 3D voxel grid coordinate of the central grid structure.

20. The device according to claim 18, wherein the position of the entity falls outside the bounds of the central grid structure, and executing the instructions further causes the device to:

identify which of the six additional grid structures the position of the entity falls into based on a coordinate axis corresponding to the coordinate component with the largest magnitude and a sign of the coordinate component with the largest magnitude of the position of the entity relative to the location of the camera;

calculate two components of the 3D voxel grid coordinate within the identified additional grid structure using the other two components of the position of the entity besides the component corresponding to the coordinate component with the largest magnitude of the position of the entity; and calculate, using a non-linear function, a third component of the 3D voxel grid coordinate within the identified additional grid structure based on a distance between the bounds of the central grid structure to the position of the entity.

* * * * *